Aug. 24, 1954 M. WALTER 2,687,223
LOAD LIFTING AND CARRYING DEVICE FOR MOTOR VEHICLES
Filed April 18, 1950 2 Sheets-Sheet 1

INVENTOR.
Maurice Walter
BY Robert S. Dunlap
Attorney

Aug. 24, 1954   M. WALTER   2,687,223
LOAD LIFTING AND CARRYING DEVICE FOR MOTOR VEHICLES
Filed April 18, 1950   2 Sheets-Sheet 2
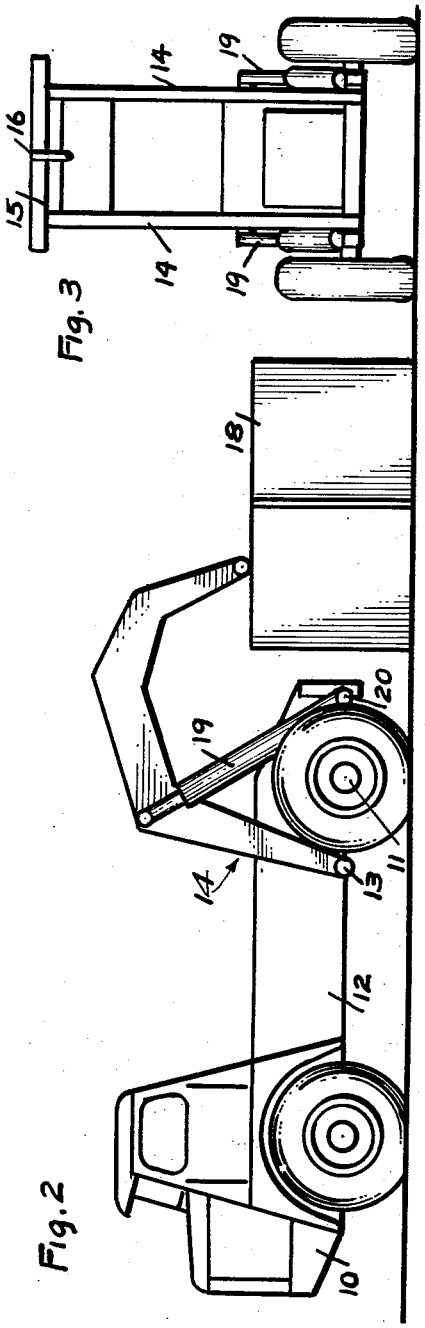
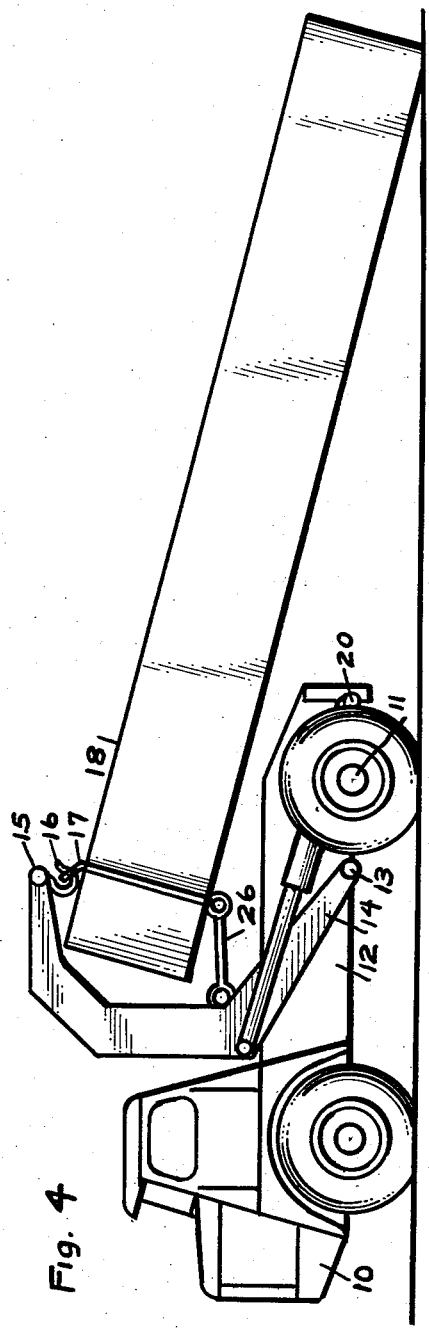
INVENTOR.
Maurice Walter
BY Robert S. Denham
Attorney Patented Aug. 24, 1954

2,687,223

UNITED STATES PATENT OFFICE 2,687,223

LOAD LIFTING AND CARRYING DEVICE FOR MOTOR VEHICLES

Maurice Walter, Lawrence, N. Y.

Application April 18, 1950, Serial No. 156,563

4 Claims. (Cl. 214—86)

The present invention relates to a load lifting and carrying device for motor vehicles such as a truck.

One object of the present invention is to provide simple power crane structure adapted for association with a motor truck with the parts so related that the crane may be displaced to reach over the rear of the truck and then lift the load and advance the same to a position ahead of the rear axle in proper position for hauling.

A further object of the present invention resides in the provision of a novel crane structure to provide for unloading by a simple reversing of the motion of the crane.

Another object of the present invention resides in the provision of a crane structure which is adapted both to lift the load from the ground and then, by a continued movement of the crane structure, to displace the load forwardly to hauling position on the vehicle.

Another object of the present invention is to provide a crane structure which can be utilized to assist the motor vehicle on encountering soft ground conditions. More particularly, crane power may be utilized to impart a lifting force to the rear end of the truck, together with a force which tends to advance the truck.

Previous devices of this class have been of two general types. In one, the conventional crane merely lifted the load and did not bring the load forward to a stable carrying position. Other types lifted the load with a crane and then provided supplementary mechanism to advance the load after it was raised or lifted. According to the present invention, these drawbacks of previous structures are obviated.

A further object of the present invention resides in the provision of an extremely simple crane structure adapted for easy assembly upon a truck which will secure the desired results heretofore mentioned.

Further objects and advantages will be hereinafter pointed out in the accompanying specification and claims and shown in the drawings which show, by way of illustration, what I now consider to be a preferred embodiment of the invention.

In the drawings:

Fig. 2 is another side elevational view of a modified embodiment and with the crane in rearward or back position to pick up the load or to press downwardly and forwardly and thus assist the vehicle over soft ground;

Fig. 3 shows a rear view with the crane in the raised and hauling position; and

Fig. 4 shows a side view of the unit when hauling a long load with the front of the load hanging from the crane and with the rear portion of the load dragging on the ground.

Figure 1:
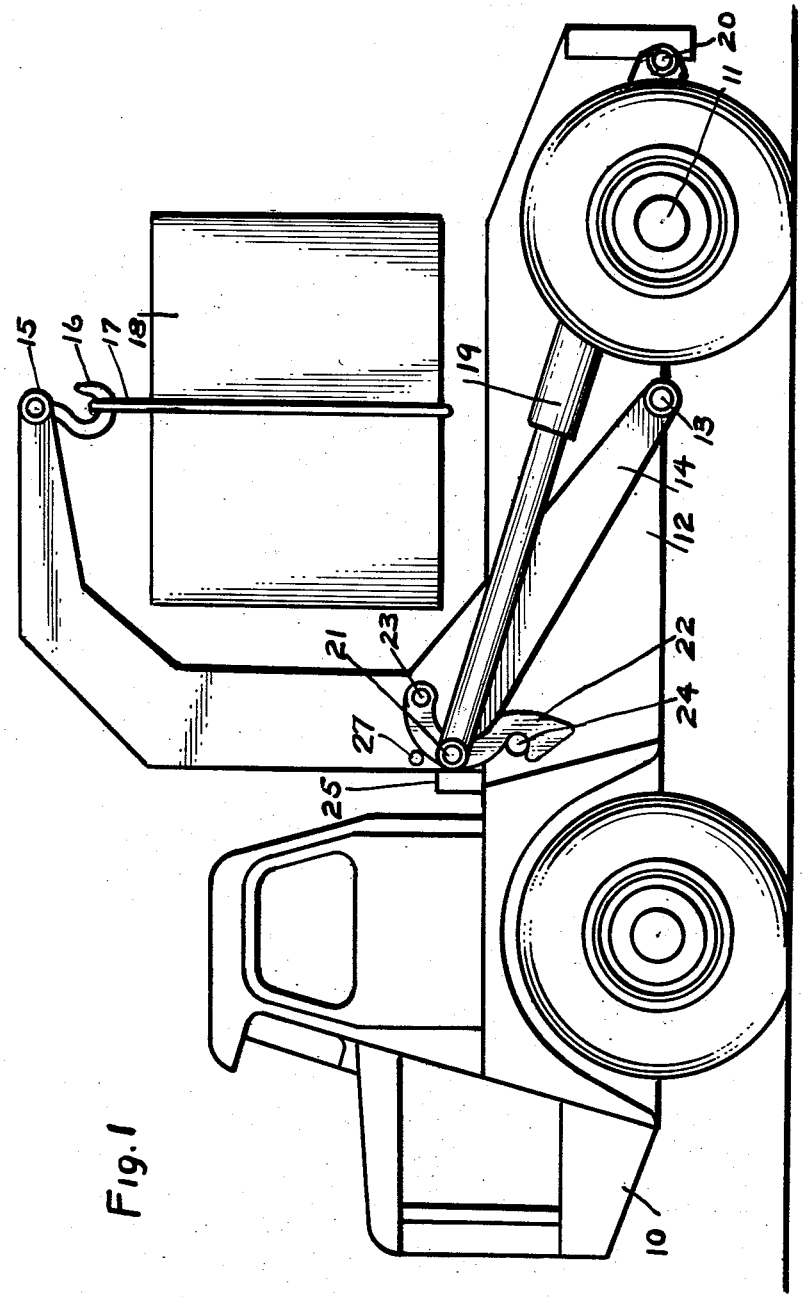
Figure 1 shows a side elevation of a vehicle equipped with my improved crane and shows the load in hauling position.

In more detail, in the drawings 10 designates a motor vehicle or truck having the usual rear axle assemblage 11 and the chassis frame generally designated 12. The crane frame 14 is preferably pivotally supported on a cross shaft 13, which is suitably supported on the frame 12 ahead of the rear axle. Obviously, in lieu of a cross shaft pivot studs may be utilized suitably carried on brackets secured to the truck frame. The crane frame 14 may be provided with a top cross bar 15. The crane frame itself, or more particularly the cross bar, is adapted to support a hook or fastener 16 to hold the cable, link or chain 17, which holds the load 18. Power actuated means are provided for pivoting the crane frame. While any power actuated means may be provided, I prefer to utilize double acting hydraulic rams 19 which are swively mounted at pivot points 20 on the truck frame and at pivotal points 21 on hooks or latches 22 which are pivoted at 23 on the crane frame and which are adapted to engage studs 24 on the truck frame. Preferably two of these double acting hydraulic rams will be provided, one at each side of the vehicle.

When the hydraulic rams are compressed, the hooks 22 are first disengaged. Then the crane frame 14 is pivoted back and swings over the rear of the vehicle to place the hook 16 in a position to reach over the load. After the load is secured, the hydraulic rams are extended and the crane frame swings pivotally in an up and forward direction first to lift up the load from the ground and thereafter to advance the load to a carrying position with the weight of the load ahead of the rear axle to afford proper weight distribution and stability (see Figures 1 and 4). It should be noted that a single movement of the crane frame both lifts and advances the load. Accordingly, supplemental load shifting devices for advancing the load along the vehicle may be dispensed with.

The final thrust of the rams forces the hooks 22 to engage the studs 24 on the truck frame. The hooks are prevented from excessive movement clockwise about the pivots 23, as seen in Fig. 1, by suitable stops as shown at 27. These hooks securely lock and hold the crane frame to the truck frame and relieve the hydraulic rams of any pressure due to hauling reactions.

For unloading a loaded vehicle, as the rams are compressed, the latches are first disengaged, thereafter the load is carried backward and then lowered and deposited on the ground.

As will be apparent from Figure 1, the crane frame has an arch shaped configuration as seen from the side to provide for advancing the load to the desired forward position with the center of gravity substantially ahead of the rear axle.

In this position, the center line of the hook is slightly forward of the pivotal point of the crane frame on the truck chassis. This provides for stability in carrying the load. Forward tilting movement of the frame may be limited in addition to the hooks 22 by a cross member 25 on the crane frame which rests on the chassis frame when the crane is in the load carrying position.

As will be apparent from Fig. 2, if the hydraulic rams are further compressed, this action will cause the crane frame to exert a downward pressure on the load or any underlying support, which will, in turn, exert a lifting effect on the rear end of the truck and also impart some component of forward thrust to the truck.

In handling long loads, such as pipes or long timbers (see Fig. 4), the lifting action of the crane facilitates the placing of a dolly or pole trailer under the pipe or timber. For short hauls, the pipe or timber may be hauled with the forward end supported from the crane hook and the other end of the relatively long load dragging on the ground.

For such hauling a link, or chain, or cable 26 may be connected from the load to the crane frame at a relatively low point so as to reduce the leverage of the pull tending to pivot the truck unit back on the rear axle. The link also serves to steady the load against excessive swaying.

It will be understood that the truck will be provided with a hydraulic pump driven by the pump engine and suitable control valves will be provided in the operator's cab so that crane operators may be effected rapidly.

In lieu of the double acting hydraulic rams, suitable mechanical means can be used such as a screw and nut mechanism, or even other reduction gearing arrangements. Preferably these are power driven. The hydraulic rams are, however, advantageous as regards control, weight, strength and cost.

Also in lieu of double acting rams, it is possible to substitute two opposing single acting rams. One ram will be used to lift the load and the other to lower the load. A single double acting ram also might be provided but the double construction is preferable.

The arch shaped crane minimizes overall height when the parts are in load carrying position and permits hanging bulky loads.

According to the present invention, the extent of the forward and backward movement of the crane, hook or end may be made closely to approach double the attainable height of lift.

With the load shifted forwardly, the weight of the load is hung or carried on the vehicle ahead of the rear axle so that the load weight may be divided between the front and rear tires. This permits travelling at relatively high rates of speed over rough and uneven ground.

Furthermore, the relation or position of the crane frame with the pivot point directly ahead of the rear axle is such that the maximum lifting capacity and carrying capacity is obtained with stability in relation to the vehicle weight. The vehicle and units can readily be built to carry a load as great as its own weight.

What is claimed is:

1. A lift and haul motor vehicle including the usual vehicle frame and rear axle, a crane pivotally supported on the vehicle frame ahead of the rear axle, latches pivoted on the crane frame adapted to engage the truck frame, and double acting hydraulic rams pivotally connected to the vehicle frame and connected to the aforesaid latches for pivotally displacing the crane frame and for engaging said latches.

2. The invention according to claim 1 wherein the hydraulic rams are adapted to first disengage the latches and thereafter pivotally swing the crane frame to a load pickup position.

3. The combination with a motor vehicle having a chassis, front wheels and rear wheels which are rotatable respectively about front and rear axes disposed at substantially predetermined positions in respect to said chassis, of a combined load lifting and carrying device, comprising a crane frame including a pair of similar side members rigidly interconnected with each other, means mounting said crane frame on said chassis for pivotal movement about an axis which is disposed at about the same level as said front and rear axes and a substantial distance forwardly of said rear axis toward said front axis, a pair of similar power actuated means for positively angularly moving said crane frame about the axis of pivotal movement thereof and in both directions in respect to said chassis, one of said similar power actuated means being attached to each of said similar side members of said crane frame, each of said side members of said crane frame being arch shaped with their concave sides toward the rear of said vehicle, and means carried by a rigid interconnection between the ends of said side members removed from the axis about which said crane frame is mounted for pivotal movement for attachment to a load, said arch shaped side members being adapted to support a load having a lateral width greater than the distance between said side members, and said crane frame being movable rearwardly to the position to apply positive force from said power actuated means tending to lift said rear wheels of said vehicle and to move said vehicle forwardly.

4. A combined load lifting and carrying device for a motor vehicle in accordance with claim 3, wherein said crane frame is provided with stop means arranged to engage against a portion rigid with said chassis at one predetermined terminal position of said crane frame, in which position said crane frame has said means for attachment to a load positioned forwardly of the axis of pivotal movement of said crane frame, so that the weight of a load carried thereby is effective in tending to hold said crane frame in said predetermined position with said stop means bearing against a part rigid with said chassis.

References Cited in the file of this patent

UNITED STATES PATENTS

| Number | Name | Date |
|---|---|---|
| 538,186 | Widdows | Apr. 23, 1895 |
| 1,019,268 | Melzer | Mar. 5, 1912 |
| 1,498,151 | Butler | June 17, 1924 |
| 1,649,574 | Conway | Nov. 15, 1927 |
| 2,078,393 | Le Tourneau | Apr. 27, 1937 |
| 2,331,713 | Mosling | Oct. 12, 1943 |
| 2,332,962 | Barret | Oct. 26, 1943 |
| 2,433,598 | Chadwick | Dec. 30, 1947 |
| 2,468,602 | Lord | Apr. 26, 1949 |

FOREIGN PATENTS

| Number | Country | Date |
|---|---|---|
| 483,128 | France | Mar. 8, 1917 |
| 123,679 | Australia | Feb. 21, 1947 |